Sept. 15, 1959 A. B. WELTY, JR., ET AL 2,904,503
METHOD OF INITIATING A CATALYTIC HYDROFORMING PROCESS
Filed Aug. 20, 1954
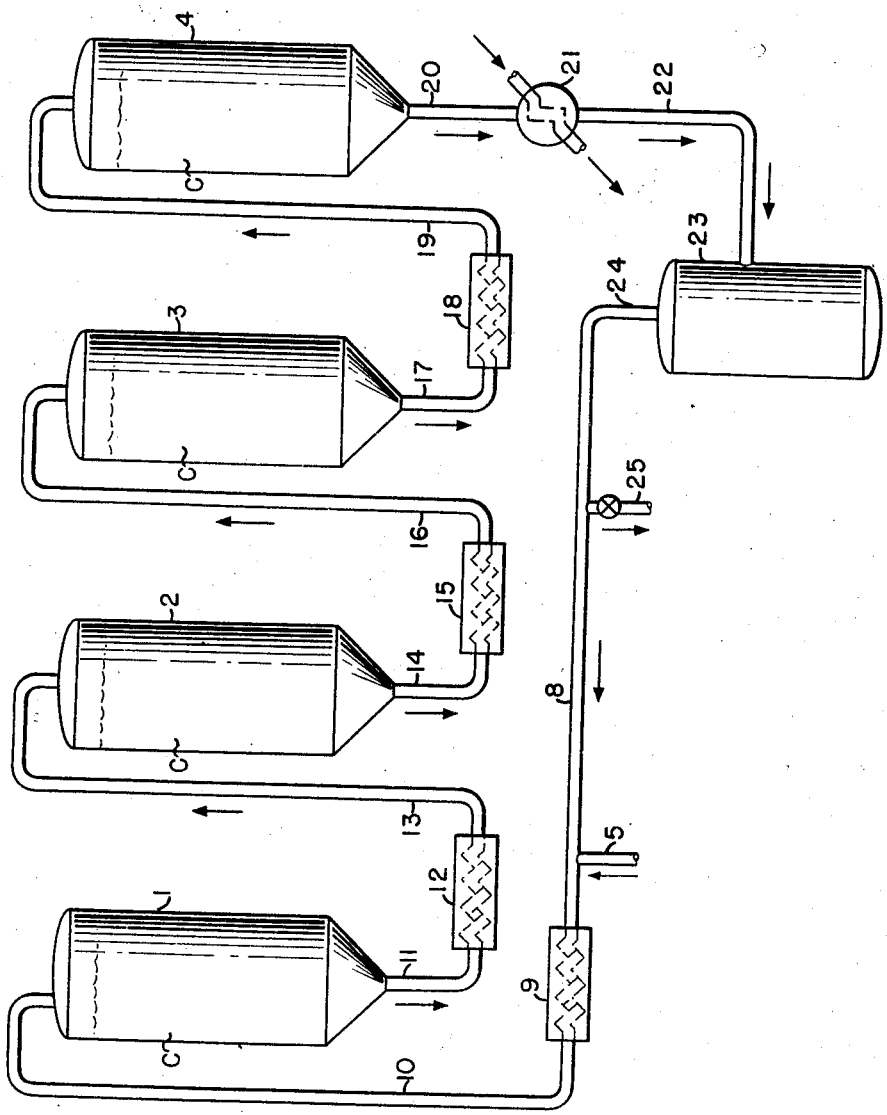
ALBERT B. WELTY, JR. INVENTORS
DONALD D. MACLAREN
BY J. Cashman
ATTORNEY

United States Patent Office

2,904,503
Patented Sept. 15, 1959

2,904,503

METHOD OF INITIATING A CATALYTIC HYDROFORMING PROCESS

Albert B. Welty, Jr., Westfield, and Donald D. MacLaren, Scotch Plains, N.J., assignors to Esso Research and Engineering Company, a corporation of Delaware Application August 20, 1954, Serial No. 451,255

3 Claims. (Cl. 208—138)

The present invention relates to improvements in hydroforming of naphthas. More particularly, the present invention relates to a non-regenerative type of hydroforming in which the catalyst is a platinum group metal.

Hydroforming is now a matter of record and commercial practice in this country. Naphthas are now being reformed commercially in processes in which the catalyst is platinum. These operations employ the catalyst in a form of a fixed bed. There is also in commercial operation in this country a hydroforming plant employing a fluidized bed of catalyst, which catalyst is composed of molybdenum oxide carried on an active form of alumina. Hydroforming is a process designed to improve the octane value of naphthas. The naphthas so treated may be virgin naphthas, cracked naphthas, naphthas obtained from Fischer synthesis process, or mixture of these naphthas. The process of hydroforming is carried out usually in the presence of added hydrogen, the said hydrogen serving to repress carbon formation on the catalyst, which carbon tends to deactivate the catalyst. The reactions involved in hydroforming are (1) dehydrogenation of naphthenes to the corresponding aromatic as where methylcyclohexane is dehydrogenated to form toluene, (2) isomerization of paraffins to form branched chain paraffins or isomerization of ring compounds, such as ethylcyclopentane to form methylcyclohexane, which latter compound is then dehydrogenated to form toluene and (3) hydrocracking of the higher boiling constituents of the feed to form lower boiling constituents.

In the non-regenerative type of hydroforming, using platinum or palladium catalyst, the operation is conducted at elevated pressures, say, of the order of at least 300 p.s.i.g. It is also conducted so as to feed to the reaction zone a relatively large amount of "recycle" gas, i.e., a gas rich in hydrogen. In the type of operation here in question, from 4000–7000 standard cubic feet of hydrogen are fed to the hydroforming zone with each barrel of oil feed. The pressure conditions and the amount of hydrogen fed to the reaction zone serves, as previously stated, to repress the deactivation of the catalyst by retarding the deposition on said catalyst of carbonaceous and other deposits. In order to be feasible economically, the catalyst should have a life of about six months before it is necessary to remove the catalyst and replace it with fresh catalyst.

The present invention contemplates the use of a plurality of reactors, preferably four reactors operating in series. Due to the endothermic nature of the hydroforming reaction, there is a decline in the temperature of the bed and the reactants from the inlet to the outlet of the several reactors, this temperature differential being greatest in the first or lead reactor. Consequently, it is necessary to reheat the reactants between each of the reactors.

In brief compass, the present invention provides means for hydroforming naphthas under conditions such that high yields of high octane gasoline may be produced in an operation employing a fixed bed of a platinum group metal catalyst, which catalyst is utilized for an extended period of time without requiring regeneration or necessitating replacement by fresh catalyst.

Another feature of the present invention resides in the concept of starting up or initiating the hydroforming reaction under temperature conditions which will extend the time period in which the catalyst may be employed to produce high yields of high octane gasoline. Thus, the present invention proposes initiating the hydroforming reaction at temperatures within the range of from about 700°–800° F. followed by gradual increase to normal operating temperatures of, say, 900°–1000° F.

Another feature of the present invention involves the utilization of a catalyst comprising platinum carried on a specially prepared alumina base or spacing agent, which alumina is largely in the form of eta alumina. It has been found that this type of catalyst has high activity and selectivity and can be utilized for an extended period of time under proper conditions of pressure and recycle gas rates to produce high yields of high octane gasoline without necessitating interruptions of the on-stream phase to regenerate the catalyst or to replace it with freshly prepared catalyst.

The main object of the present invention is to provide a commercially feasible non-regenerative hydroforming operation adapted to produce high yields of high octane number gasoline constituents.

Another object of the present invention is to provide a hydroforming operation adapted to employ a platinum-containing catalyst of high initial activity, which activity is maintained for an extended period of time.

Another object of the present invention is to provide means for initiating a hydroforming reaction employing a platinum-containing catalyst in such a manner as to extend the useable catalyst life of the said platinum-containing catalyst.

Other and further objects of the present invention will appear in the following more detailed description and claims.

In the accompanying drawing, there is set forth, diagrammatically, merely the essential elements or component parts of an apparatus layout in which a preferred modification of the present invention may be carried into effect.

Referring in detail to the drawing, 1, 2, 3 and 4 represent four reactors each containing fixed bed of catalyst C. This catalyst, which substantially fills the reactors, is in the form of pills or pellets, having a size of from about $\frac{1}{16}''$ to $\frac{3}{8}''$. In operation naphtha in line 5 is combined with recycle gas stream 8 and heated in furnace 9 to a temperature of about 875°–950° F. The combined stream is then fed via line 10 to the top of reactor 1. It should be pointed out that the combined stream entering furnace 9 is not cold, but is preferably preheated by heat exchange with the hot overhead product from reactor 4. The oil and hydrogen pass downwardly through reactor 1 under hydroforming conditions more fully set forth hereinafter and in contact with the bed of catalyst C, and at least a partial hydroforming of the naphtha feed is obtained. The product is withdrawn from reactor 1 via line 11, reheated in furnace 12 to a temperature of from about 875° to 975° F., and thence passed via line 13 into the top of reactor 2 wherein it is passed downwardly in contact with the bed of catalyst C and further hydroforming of the oil feed occurs. The product of the second reactor is withdrawn through line 14 and reheated in a third furnace 15 to a temperature of from about 875° to 975° F., and thence passed via line 16 into the top of the third reactor 3. The oil and hydrogen-containing gas pass downwardly through reactor 3 wherein further hydroforming occurs, and the product is withdrawn through line 17 and passed to a fourth furnace 18 wherein the material is heated to a temperature of 875° to 975° F., and thence passed via line 19 into reactor 4. The final product is withdrawn from reactor 4, through line 20, cooled in heat exchange means 21 or similar cooling means to a temperature of about 100° F., and thence charged to a separator 23 via line 22. From separator 23 there is withdrawn overhead through line 24 gasiform material which is principally hydrogen-containing gas, which gas may be recycled to line 8 for further use in the process. A portion of this gas may be rejected from the present system through line 25.

It will be understood, of course, that much accessory apparatus, not shown in the drawing, would be included in a commercial plant. Thus, temperature recording and control devices, pumps, additional heat exchange equipment for conservation of heat and similar conventional apparatus well known to the chemical engineer, would be included and form a part of a commercial plant, embodying the present invention. This additional apparatus has been omitted purposely in the interest of simplicity and to emphasize the present improvements.

An important feature of the present invention, going to the matter of rendering the same commercially feasible, includes the use of a proper catalyst. A satisfactory catalyst is one which contains from 0.05–1.5 wt. percent of platinum carried on alumina, which alumina is predominantly in the eta form. A minor percentage, say, 2–3 wt. percent of silica, based on the total weight of the catalyst, may be included as a component of the carrier or base. A good way to make a satisfactory catalyst is to treat metallic aluminum with an alcohol, such as amyl alcohol. A small amount of mercury chloride may be included in the mixture to promote the formation of aluminum alcoholate. While the formation of the aluminum alcoholate occurs at room temperature, it is preferable to heat the reaction mixture to a temperature at about the boiling point of the alcohol, or in other words, to reflux the mixture at the temperature indicated. The aluminum alcoholate is then treated at about 80° F. with an excess of water, say, two parts of water per part of liquid, i.e., the alcohol used in the reaction. The water preferably contains about 10 vol. percent of concentrated ammonium hydroxide. The addition of the water effects hydrolysis of the aluminum alcoholate which precipitates partly in the form of beta trihydrate and monohydrate of aluminum. The precipitate or slurry is permitted to age for a period of at least four hours, say, 4–10 hours, whereupon the alumina is substantially completely converted to the beta trihydrate form. The liquid is separated from the precipitate, the latter is dried and calcined in air. The drying of the alumina slurry occurs at a temperature within the range of from 200°–400° F., and this drying effects the removal of the ammonia and aqueous material with which the alumina is associated. The calcining operation which results in the formation of crystalline beta alumina is carried out at a temperature of from 450°–1100° F.

The incorporation of the platinum component may be accomplished before or after the calcination. A good way to incorporate the platinum component of the catalyst is to impregnate the alumina carrier or base with a water soluble compound of platinum such as chloroplatinic acid. A commercially used aqueous platinum solution is one containing 15 grams of $H_2PtCl_6 \cdot xH_2O$ (40 weight percent platinum). A sufficient amount of this platinum solution is used per pound of eta alumina to yield a catalyst containing about 0.5 weight percent platinum in making a good catalyst. The alumina support containing the platinum solution is heated to dryness at temperatures of from 100°–600° F. at atmospheric pressure to remove most of the water. The dried catalyst is then treated with a hydrogen-containing gas at a temperature of 200°–1000° F. at normal or elevated pressures during a period of from 4–24 hours.

The foregoing catalyst, or any good platinum catalyst, is charged to the reactor shown in the drawing. A feed having the following inspections may be hydroformed with good results under conditions set forth below:

Feed inspection

| | |
|---|---|
| Boiling range °F. | 207–327 |
| Vol. percent naphthenes | 41 |
| Vol. percent paraffins | 44 |
| Vol. percent aromatics | 15 |
| Vol. percent olefins | 0 |
| Octane rating CFRR | 58 |

Conditions in reactor 1

| | |
|---|---|
| Average catalyst bed temperature | 850° F. |
| Pressure | 400 p.s.i.g. |
| Oil feed rate | 1.0 w./hr./w. (based on catalyst in all reactors). |
| Standard cubic feet of hydrogen fed to reaction zone per barrel of oil fed to the reaction zone per hour | 6000. |
| Concentration of hydrogen in hydrogen-containing gas | 90–95 vol. percent. |

During the passage of the reactants through reaction zone 1, there is, of course, a temperature drop since the reaction is adiabatic. This temperature drop may be from an inlet temperature of 925° F. to an outlet temperature of about 790° F. Between the first and second reactor, the product withdrawn from the first reactor is reheated to a temperature of about 925° F. and charged to reactor 2. In reactor 2, there is another temperature drop between the inlet and the outlet of the reactor, this temperature differential amounting to about 80°–90° F. The product withdrawn from reactor 2 is reheated from a temperature of 840° F. to a temperature of 925° F. and charged to reactor 3. The product from reactor 3 is withdrawn and reheated from a temperature of about 870° to 925° F. and charged to reactor 4. In addition, there is, of course, a pressure drop as the reactants pass through the four reactors in series. The total pressure drop through the four reactors amounts to about 87 p.s.i.g. Of course, this figure of 87 p.s.i.g. is merely representative and the pressure drop may vary from 65 to 115 p.s.i.g.

Inspection of product

The product obtained from the feed identified above and treated under the conditions set forth above had the following inspection:

| | |
|---|---|
| Vol. percent $C_5$ hydrocarbons based on feed | 85.4 |
| Vol. percent naphthenes in liquid product | 6.1 |
| Vol. percent aromatics in liquid product | 55.8 |
| Vol. percent paraffins in liquid product | 38.1 |
| Vol. percent olefins in liquid product | 0 |
| Octane number, CFRR | 92.8 |

An important feature of the present invention has to do with the starting up operation. Since in this process it is desired to utilize the catalyst without regeneration or replacement for a continuous period of 6–8 months, it is, of course, necessary to take every precautionary step to prevent deactivation of the catalyst. A pressure of 400 to 700 pounds in addition to recycle gas rates from 4000 to 8000 standard cubic feet of hydrogen-containing gas per barrel of oil tend to retard deactivation of the catalyst. However, it is important during the early stages of the operation, in other words, when starting up the operation, to control the temperature in the several reactors very carefully during this critical period. Accordingly, the initiating operation temperature should be from about 700° to 800° F. and should be gradually increased during the period of 6–24 hours to normal operating temperatures which may be of the order of from about 850°–925° F. To give more details regarding the starting up of the process, it is pointed out that a good way to start up a process of the type herein described from a cold system is to pressure with appropriate gas and then to recirculate this gas through the reactors and furnaces until a temperature of about 800° F. is reached by the several beds of catalyst. The gas used depends upon availability at the particular unit in question. Hydrogen-rich recycle gas or hydrogen gas itself can be used. These will not always be available, however, and in that case nitrogen gas or natural gas or other similar gas can be used. In this case it is important not to let the catalyst temperature get too high before the feed is introduced, otherwise the catalyst will be fouled before enough hydrogen is generated to protect it. When the catalyst beds are up to about 800° F., oil at 700°–800° F. is introduced, gas recirculation continuing at the normal rate. Furnace temperatures are gradually increased over a period of 6–24 hours to that which gives the severity of operation desired. This might be, for example, 880°–930° F. Hydrogen will be made and will gradually displace the nitrogen, natural gas, etc. in the system as gas is released in order to hold the desired operating pressure on the system. Reactor inlet temperatures should not be allowed to exceed about 850° F. until the hydrogen concentration has become at least 50% of that normally obtaining during the run once it is underway.

Since the reaction is endothermic, the bed temperature will decrease. Of course, the oil and hydrogen will have to be heated between stages in this series reaction process, but the important consideration is to charge the oil to fresh catalyst initially at the relatively low temperatures indicated above.

Numerous modifications of the present invention may be made by those who are familiar with the present art.

What is claimed is:

1. In the method of initiating a catalytic hydroforming process for naphtha which operates at hydroforming temperatures above 850° F., under pressure of from 400 to 700 p.s.i.g. and recycle gas rates of from 4000 to 7000 standard cubic feet of hydrogen per barrel of oil, the improvement which comprises circulating heated gas through the catalyst bed until a temperature of about 700°–800° F. is attained, introducing the naphtha feed at temperatures of 700°–800° F., and thereafter gradually increasing the temperature in the reaction zone during a period of 6 to 24 hours until the normal hydroforming temperatures in the reaction zone are obtained.

2. The method of claim 1 in which the catalyst is one of the platinum group metals and the heated gas is selected from the group consisting of hydrogen, hydrogen-containing recycle gas, natural gas and nitrogen.

3. The method of claim 2 in which the catalyst is platinum on alumina.

References Cited in the file of this patent

UNITED STATES PATENTS

| | | |
|---|---|---|
| 2,388,536 | Gunness | Nov. 6, 1945 |
| 2,432,822 | Secor | Dec. 16, 1947 |
| 2,472,844 | Munday et al. | June 14, 1949 |
| 2,659,692 | Haensel et al. | Nov. 17, 1953 |
| 2,667,461 | Guyer et al. | Jan. 26, 1954 |
| 2,773,013 | Wolf et al. | Dec. 4, 1956 |